US009626658B2

(12) United States Patent
Mustaine (10) Patent No.: US 9,626,658 B2
(45) Date of Patent: Apr. 18, 2017

(54) SYSTEM AND METHOD FOR GENERATING A TASK LIST (71) Applicant: Thomas W. Mustaine, Dallas, TX (US)

(72) Inventor: Thomas W. Mustaine, Dallas, TX (US)

( * ) Notice: Subject to any disclaimer, the term of this patent is extended or adjusted under 35 U.S.C. 154(b) by 158 days.

(21) Appl. No.: 14/216,871

(22) Filed: Mar. 17, 2014

(65) Prior Publication Data
US 2014/0289265 A1    Sep. 25, 2014

Related U.S. Application Data

(60) Provisional application No. 61/794,227, filed on Mar. 15, 2013.

(51) Int. Cl.
*G06Q 10/10*    (2012.01)

(52) U.S. Cl.
CPC .................. *G06Q 10/109* (2013.01)

(58) Field of Classification Search
CPC ... G06F 17/2247; G06Q 10/109; G06Q 10/10
USPC .......................................................... 707/705
See application file for complete search history.

(56) References Cited

U.S. PATENT DOCUMENTS

| | | | | |
|---|---|---|---|---|
| 2003/0182391 A1* | 9/2003 | Leber | ................ | G06F 17/30864 709/217 |
| 2007/0073810 A1* | 3/2007 | Adams | ................ | G06Q 10/107 709/205 |
| 2007/0079260 A1* | 4/2007 | Bhogal | ................ | G06Q 10/109 715/700 |
| 2008/0077888 A1* | 3/2008 | Miksovsky | .......... | G06Q 10/109 368/29 |
| 2009/0157466 A1* | 6/2009 | Bank | ................... | G06Q 10/1095 705/7.19 |
| 2010/0004921 A1* | 1/2010 | Hufnagel | ............ | G06F 17/2881 704/9 |
| 2010/0332280 A1* | 12/2010 | Bradley | ........... | G06Q 10/06316 705/7.26 |
| 2011/0313803 A1* | 12/2011 | Friend | .................. | G06Q 10/109 705/7.13 |

(Continued)

OTHER PUBLICATIONS

Article entitled "Gmail Now Supports Managing Tasks", by Google Blogscoped, dated Dec. 9, 2008.*

(Continued)

*Primary Examiner* — Mahesh Dwivedi (57) ABSTRACT

A method includes receiving at least a portion of a task. The method also includes parsing the task as the task is being received to identify a keyword in the task. In addition, the method includes, in response to identifying the keyword, applying the keyword to one or more parameters of the task while the task is being received to produce a modified task. The method could further include parsing a second task that is received subsequent to the received task, identifying a second keyword in the second task, and associating the second task with the received task in response to identifying the second keyword. Associating the second task with the received task could include determining a hierarchy between the second task and the received task based on the second keyword or determining that the second task is a subtask of the received task based on the second keyword.

20 Claims, 3 Drawing Sheets

(56) References Cited

U.S. PATENT DOCUMENTS

| | | | | |
|---|---|---|---|---|
| 2011/0314404 A1* | 12/2011 | Kotler | .................. | G06Q 10/109 |
| | | | | 715/772 |
| 2012/0023454 A1* | 1/2012 | Pieruschka | .......... | G06Q 10/109 |
| | | | | 715/853 |
| 2012/0035925 A1* | 2/2012 | Friend | .................... | G06F 3/167 |
| | | | | 704/235 |
| 2012/0311585 A1* | 12/2012 | Gruber | .................... | H04W 4/02 |
| | | | | 718/100 |
| 2013/0007648 A1* | 1/2013 | Gamon | ................ | G06Q 10/109 |
| | | | | 715/771 |
| 2013/0138622 A1* | 5/2013 | Ayers | ................ | G06F 17/30058 |
| | | | | 707/706 |
| 2014/0006082 A1* | 1/2014 | Harms | ................ | G06Q 10/1095 |
| | | | | 705/7.19 |
| 2014/0189017 A1* | 7/2014 | Prakash | ............... | G06Q 10/109 |
| | | | | 709/206 |

OTHER PUBLICATIONS

Article entitled "Five Best To-Do List Managers", by Henery, dated Jul. 9, 2012.*

* cited by examiner

SYSTEM AND METHOD FOR GENERATING A TASK LIST

CROSS-REFERENCE TO RELATED APPLICATION AND PRIORITY CLAIM

This application claims priority under 35 U.S.C. §119(e) to U.S. Provisional Patent Application No. 61/794,227 filed on Mar. 15, 2013. This provisional patent application is hereby incorporated by reference in its entirety.

TECHNICAL FIELD

This disclosure is generally directed to a system and method for generating a task list.

BACKGROUND

With the ubiquity of electronic devices, many people have turned to computers to help manage their numerous tasks at work and at home. To help people who are trying to manage these tasks, electronic task and calendaring programs have been developed to assist in generating task lists.

SUMMARY

This disclosure provides a system and method for generating a task list.

In a first embodiment, a method includes receiving at least a portion of a task. The method also includes parsing the task as the task is being received to identify a keyword in the task. The method further includes, in response to identifying the keyword, applying the keyword to one or more parameters of the task while the task is being received to produce a modified task.

In a second embodiment, an apparatus includes at least one processing device configured to receive at least a portion of a task. The at least one processing device is also configured to parse the task as the task is being received to identify a keyword in the task. The at least one processing device is further configured, in response to identifying the keyword, to apply the keyword to one or more parameters of the task while the task is being received to produce a modified task.

In a third embodiment, a non-transitory computer readable storage medium includes instructions that, when executed by at least one processing device, cause the at least one processing device to receive at least a portion of a task. The non-transitory computer readable storage medium also includes instructions that, when executed by the at least one processing device, cause the at least one processing device to parse the task as the task is being received to identify a keyword in the task. The non-transitory computer readable storage medium further includes instructions that, when executed by the at least one processing device, cause the at least one processing device to, in response to identifying the keyword, apply the keyword to one or more parameters of the task while the task is being received to produce a modified task.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
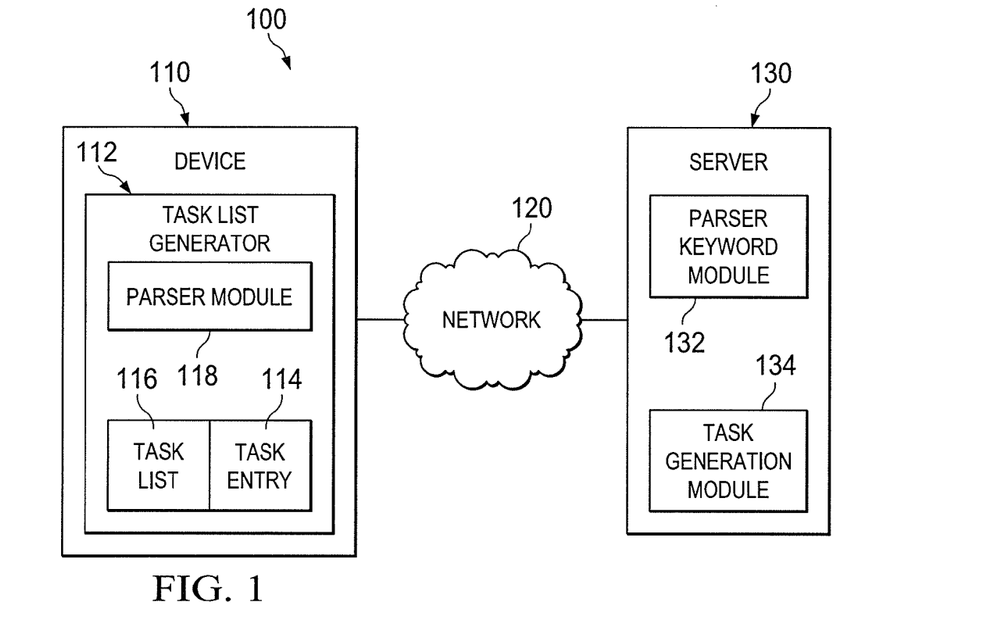
FIG. 1 is a block diagram that illustrates an example system that is used for creating and processing task items according to an embodiment of this disclosure.

FIG. 1 is a block diagram that illustrates an example system 100 that is used for creating and processing task items according to an embodiment of this disclosure. As shown in FIG. 1, the system 100 includes a device 110, a network 120, and a server 130.

The device 110 may be any computing device that is capable of receiving input from a user and displaying information about tasks. For example, the device 110 may be a desktop computer or a handheld device, such as a laptop computer, a tablet computer, or a "smart" phone. In the illustrated embodiment, the device 110 includes a task list generator 112. The task list generator 112 is configured to generate task items based at least in part on task entries. The task list generator 112 may include one or more user interfaces, such as a task entry interface 114 and a task list interface 116 as described in further detail below with respect to FIG. 2, which display information about tasks. The task list generator 112 may also include a parser module 118. The parser module 118 may include a natural language processor that is configured to apply natural language processing to phrases entered into the task entry interface 114. The parser module 118 may parse the phrases to determine whether any of the phrases are associated with a particular information or data type. The task list generator 112 may be implemented using hardware or a combination of hardware and software/firmware instructions.

The device 110 also includes communication technology (such as wireless technology) for sharing information with other devices. The device 110 may include a variety of integrated user interface units or may be coupled to user interface units through one or more communication ports or data links of the device 110. Examples of user interface units include a voice input unit (such as a microphone), physical input units (such as a keyboard, a mouse, a track ball, a rotary dial or wheel, a touchpad, or a touch screen), and motion sensors (such as an accelerometer, a magnetometer, or a gyroscope). Any of these user interface units may be implemented as an external unit that communicates with the device 110 to provide user input using a wired or wireless communication technology. Examples of wired communication technologies include a Universal Serial Bus (USB) interface, a FireWire interface, etc. Examples of wireless communication technologies include Bluetooth, Wi-Fi, WiMax, and infrared interfaces. Through these user interface units, the device 110 may receive physical or voice inputs from the user.

The server 130 is illustrative of a general purpose or other computing device operating as a remote server on which the functionality of the task list generator 112 may be maintained for allowing the task list generator 112 to follow a user from one device 110 to another device and/or to a mobile device or any other device on which the task list generator 112 may be deployed for use as described herein. In some embodiments, all functionality and data storage associated with the task list generator 112 may take the form of a task generation application or module having sufficient computer-executable instructions for performing the functions described herein. The task generation application or module may be resident on a single device 110 for use in association with data accessible by the device 110. Alternatively, the functionality and associated data for the task list generator 112 may be maintained and operated at the server 130.

The server 130 may host multiple modules, such as a parser keyword module 132 and a task generation module 134. The parser keyword module 132 may provide data, including keyword data, to the task list generator 112. The keyword data may be processed by the parser module 118 as described in further detail below. The task generation module 134 may be responsible for maintaining task items, where task items are created and stored in the server 130 as described in further detail below.

Communication between the device 110 and modules hosted in the server 130 is made possible via the network 120. The network 120 may be implemented by any medium or mechanism that provides for the exchange of data between various computing devices. Examples of such a network include a Local Area Network (LAN), Wide Area Network (WAN), Ethernet or the Internet, or one or more terrestrial, satellite, or wireless links. The network 120 may include a combination of networks such as those described. In some embodiments, the network 120 may transmit data according to the Transmission Control Protocol (TCP), User Datagram Protocol (UDP), and/or Internet Protocol (IP).

Task items may be created on the device 110 or in the server 130 based on input received at the device 110. Although not depicted in FIG. 1, task items may be stored on the device 110 or in the server 130 or may be synchronized to both. If task items are stored in the server 130, the task list generator 112 may retrieve the task items in response to, for example, input from a user.

In the scenario where task items are created and stored in the server 130, the task list generator 112 may be, primarily, a set of one or more user interfaces (such as the task entry interface 114 and the task list interface 116) that display information about tasks. Thus, the task generation module 134 in the server 130 can be responsible for maintaining task items.

In other embodiments, the task list generator 112 may create and store task items on the device 110. In this scenario, the task list generator 112 may be entirely responsible for maintaining task items. Further, in this scenario, the device 110 may include modules like the parser keyword module 132, the task generation module 134, or any combination thereof, which may be part of the task list generator 112 or may execute separately from the task list generator 112.

Although FIG. 1 illustrates one example of a system 100 that is used for creating and processing task items, various changes may be made to FIG. 1. For example, as noted above, the functional division shown in FIG. 1 is for illustration only. Various components in FIG. 1 could be combined, further sub-divided, moved, or omitted and additional components could be added according to particular needs. Also, the system 100 could include any number of each component shown in FIG. 1.

Figure 2:
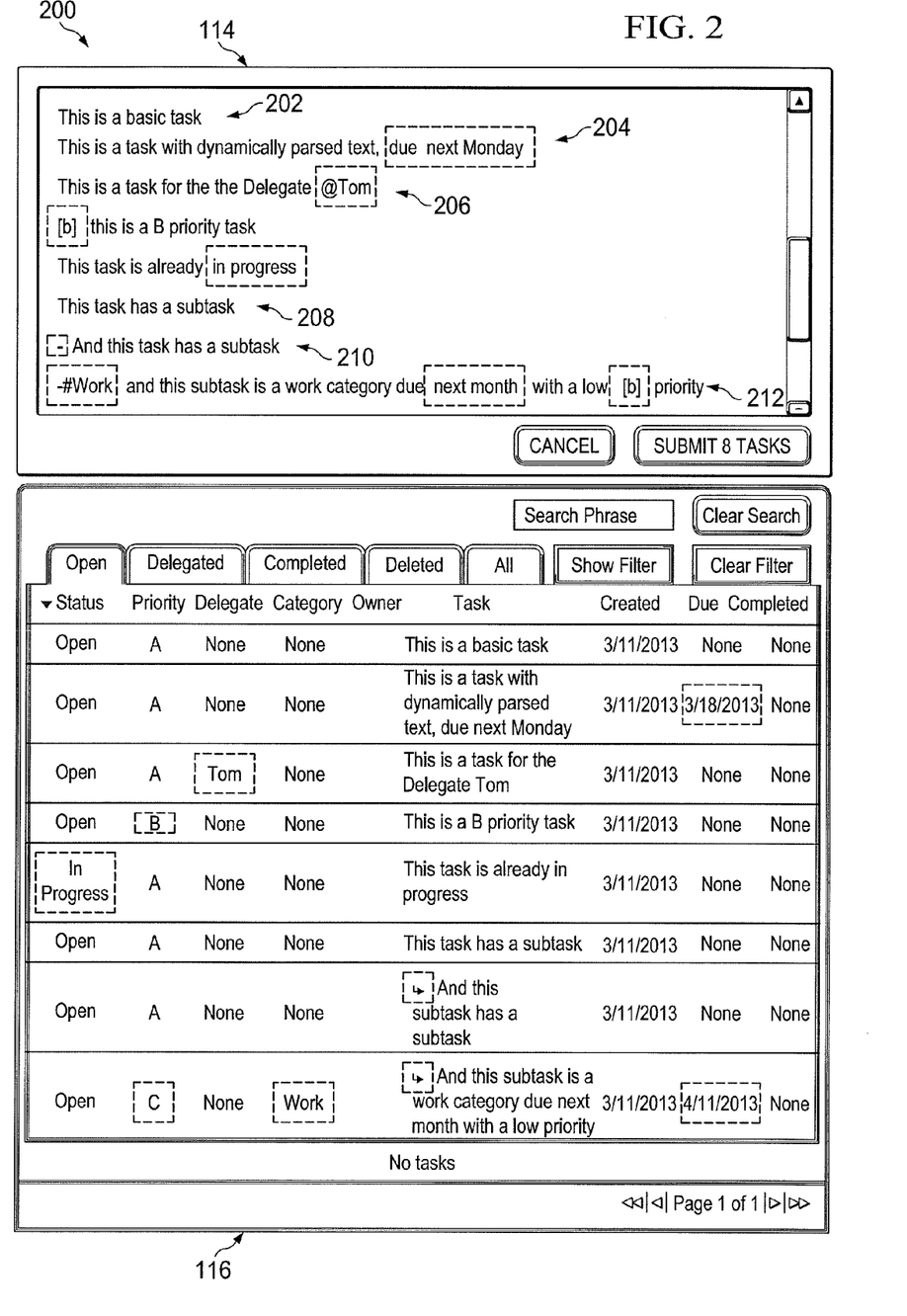
FIG. 2 illustrates an example graphical display that includes interfaces for representation of task items according to an embodiment of this disclosure.

FIG. 2 illustrates an example graphical display 200 that includes interfaces for representation of task items according to an embodiment of this disclosure. As shown in FIG. 2, the graphical display 200 includes the task entry interface 114 and the task list interface 116 that display a variety of list items. For example, tasks, events, activities or other pieces of information that have been entered manually may be displayed. In some embodiments, the task entry interface 114 and the task list interface 116 may be presented on a single web page.

Entering and editing information into the task entry interface 114 is easy and efficient. For example, information may be typed into the task entry interface 114 in a similar manner as entering a list of items in a word processing document. That is, a user may enter an item, select the "enter" key, "tab" key, or the like, and subsequent entries can be placed in the next row or sentence in the task entry interface 114. Information could also be entered in other ways, such as by voice. For ease of explanation, information entry and editing is described by typing into the task entry interface 114.

When a user begins typing a task in the task entry interface 114, the parser module 118 of FIG. 1 begins to analyze the entered text dynamically. Each letter typed in the task entry interface 114 is mirrored in the task list interface 116. The parser module 118 may be configured to recognize keywords. As used herein, the term "keywords" may include key words, key terms, key phrases, or other information components (such as tags or metadata) of an entry. As a keyword is being entered and appears in the task entry interface 114, the keyword is processed in relation to the task being written. For example, the keyword is applied to the task previewed in the task list interface 116 as the task is entered in the task view interface 114, thereby parsing the task into more detailed tasks.

To illustrate, a first entry 202 of "This is a basic task" is illustrative of a task a user may enter into the task entry interface 114. Each letter typed in the task entry interface 114 is mirrored in the task list interface 116. In this example, the parser module 118 does not recognize a keyword in the first entry. A second entry 204 of "This is a task with dynamically parsed text, due next Monday" is illustrated as having a keyword that is recognized by the parser module 118. For example, each word or combination of the words in the second entry 204 may be parsed to determine whether any particular information type is involved. For example, the words "next Monday" may be recognized as a keyword by the parser module 118. In this example, the keyword "next Monday" is applied to parameters of the task previewed in the task list interface 116 in real time to set a due date ("3/18/2013" in this example) in the task list interface 116.

A third entry 206 of "This is a task for the Delegate @Tom" is illustrated as having another keyword that is recognized by the parser module 118. For example, the "@" symbol may be recognized as a keyword by the parser module 118 and may indicate that the task is associated with a particular person or group of people. In this example, the "@" symbol is applied to one or more parameters of the task previewed in the task list interface 116 in real time to assign a delegate ("Tom" in this example) in the task list interface 116. While the "@" symbol is used in this example to associate a task with a person or group, it should be appreciated that any symbol, metadata type, or other data could be used.

For any individual task or other piece of information entered into the task entry interface 114, one or more subtasks, sub-events, or sub-items of information may be entered and associated with any previously entered tasks. To illustrate, fourth, fifth, and sixth entries 208-212 of "This task has a subtask", "-And this subtask has a subtask", and "-#Work and this subtask is a work category due next month with a low [b] priority", respectively, are illustrated as having keywords that are recognized by the parser module 118. For example, the dash ("-") in the fifth entry 210 may be recognized as a keyword by the parser module 118 and may indicate a hierarchy in entered items and/or that the task is a subtask. In this example, the dash ("-") is applied to the task previewed in the task list interface 116 in real time to create a subtask in the task list interface 116. In this example, the subtask is illustrated by a subtask symbol in the task list interface 116 and is associated with the fourth entry 208.

Similarly, the dash ("-") in the sixth entry 212 may be recognized as a keyword by the parser module 118 and may indicate that the task is a subtask. As explained above with respect to the fifth entry 210, the dash ("-") in the sixth entry 212 is applied to the task previewed in the task list interface 116 in real time to create a subtask in the task list interface 116. The subtask is illustrated by a subtask symbol in the task list interface 116.

In addition, the "#" symbol in the sixth entry 212 may be recognized as a keyword by the parser module 118 and may indicate that the task is associated with a particular category. In this example, the "#" symbol is applied to the task previewed in the task list interface 116 in real time to assign a category ("Work" in this example) in the task list interface 116. Further, the words "next month" in the sixth entry 212 may be recognized as a keyword by the parser module 118. In this example, the keyword "next month" is applied to the task previewed in the task list interface 116 in real time to set a due date ("4/11/2013" in this example) in the task list interface 116.

Further, the term "[b]" in the sixth entry 212 may be recognized as a keyword by the parser module 118 and may indicate that the task is associated with a particular priority. In this example, the word "[b]" is applied to the task previewed in the task list interface 116 in real time to assign a priority ("C" in this example) in the task list interface 116.

While the "#" symbol is used in this example to associate a task with a category, it should be appreciated that any symbol, metadata type, or other data could be used. In addition, while the word "[b]" is used in this example to associate a task with a priority, it should be appreciated that other words, symbols, or data could be used. In general, while particular keywords have been described in the examples above for ease of explanation, it should be appreciated that other keywords could be used and that a keyword list associated with the parser keyword module 132 could be modified to include other keywords.

The user may make changes to the tasks entered in the task entry interface 114 by simply modifying the text of the associated tasks. Alternatively or in addition, the user may use a pointing device (such as a mouse) to activate drop-down menus and fly-out calendars to make changes to the entered tasks. When the user is satisfied with the tasks as they appear in the task list interface 116, the user can submit those tasks to be included in a task list.

The task list is illustrative of a database list or table accessible by the device 110 locally or via the server 130, where information entered via the task list generator 112 is maintained. The task list and associated stored data may be stored or cached on the device 110. That is, according to some embodiments, each instantiation of the task list generator 112 may cause the generation of a task list table maintained in a database stored locally on the device 110 or stored in association with the server 130. As new task data is added via the task list generator 112 or as task data is changed via the task list generator 112, the task data stored in the task list is updated.

Although FIG. 2 illustrates one example of a graphical display 200 that includes interfaces for representation of task items, various changes may be made to FIG. 2. For example, the layout and arrangement of the graphical display 200 are for illustration only. In general, this type of information can be presented in a number of formats.

Figure 3:
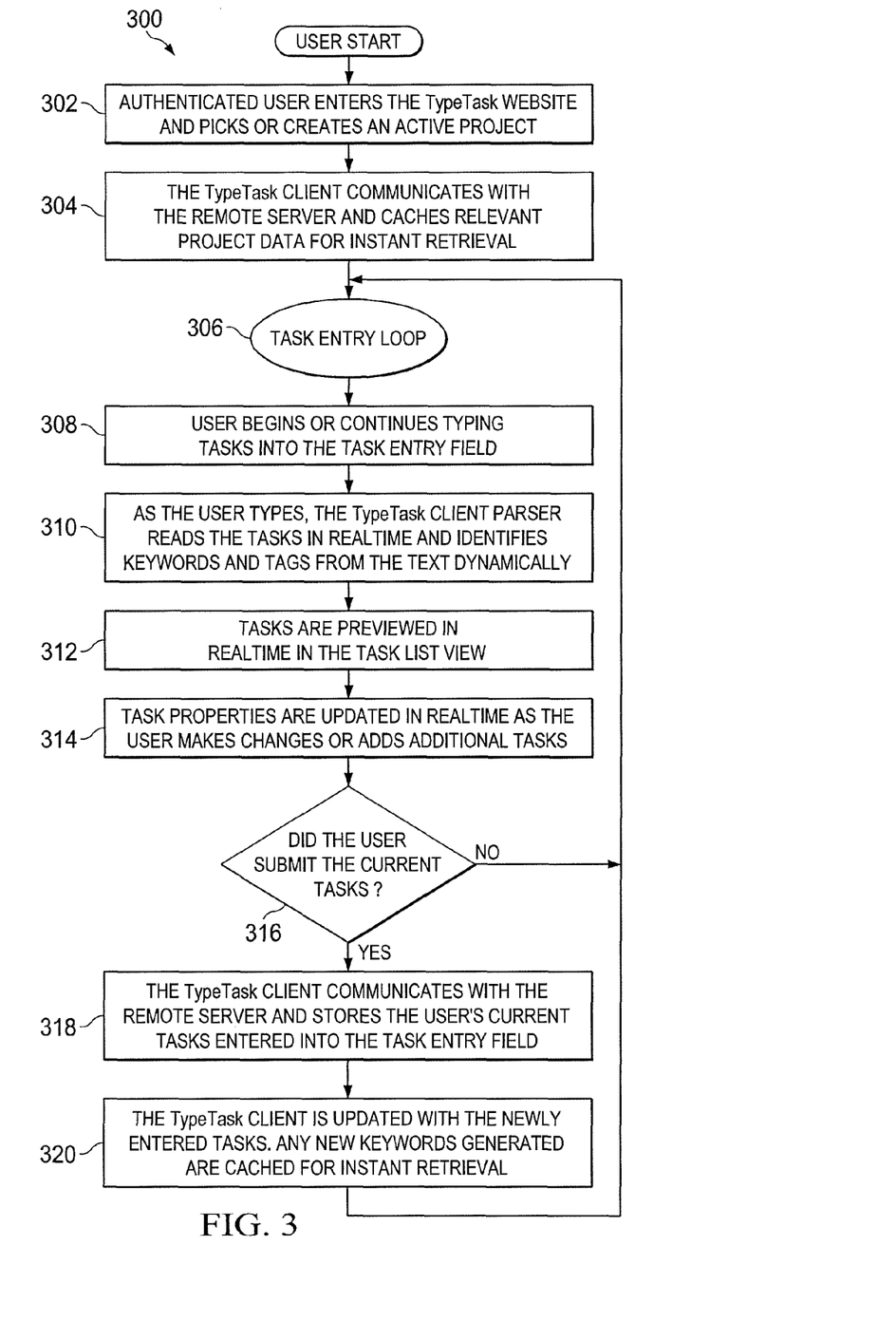
FIG. 3 illustrates an example method for generating a task list according to an embodiment of this disclosure.

FIG. 3 illustrates an example method 300 for generating a task list according to an embodiment of this disclosure. The method 300 could, for example, be performed by the device 110 of FIG. 1.

An authenticated user may select or create an active project at step 302. For example, an authenticated user may enter a designated website and select an existing project or create a new project. Note that a user can be authenticated in any suitable manner, such as by providing a valid username-password combination.

A task client (such as the device on which the user enters tasks) may communicate with a remote server and cache relevant project data for retrieval at step 304. For example, a client page may load on the device 110 of FIG. 1. Upon loading, the client page may communicate with the server 130 of FIG. 1 to download and cache the user's relevant task data. The relevant task data may include pre-existing tasks, categories, delegates, priorities, projects, owners, and task status.

A task entry loop may be entered at step 306, where the user may begin or continue typing tasks into a task entry field at step 308. For example, the user may enter tasks into the task entry interface 114 of FIG. 2.

As the user types, a client parser module or a server parser module may read the tasks in real time and identify keywords and tags from the text dynamically at step 310. For example, as the user types the tasks into the task entry field 114 of FIG. 2, the parser module 118 of FIG. 1 may read the text of the task entries in real time and identify keywords and tags from the text.

Tasks may be previewed in real time in a task list view at step 312. For example, each letter typed in the task entry interface 114 of FIG. 2 is mirrored in the task list interface 116 of FIG. 2.

Task properties may be updated in real time as the user makes changes or adds additional tasks at step 314. For example, each word or combination of words in the task entry interface 114 of FIG. 2 may be parsed by the parser module 118 of FIG. 1. If the parser module 118 identifies keywords or tags, the keyword or tag may be applied to the task previewed in the task list interface 116 of FIG. 2 in real time.

A determination may be made whether the user submitted the current tasks at step 316. If the user did not submit the current tasks, flow reverts back to step 306. If the user did submit the current tasks, the client page may communicate with a remote server and store the user's current tasks entered into the task entry field at step 318. For example, the client page may communicate with the server 130 of FIG. 1 and store, at the server 130, the user's current tasks that were entered into the task entry interface 114.

The client page may be updated with the newly entered tasks and any new keywords generated may be cached for retrieval at step 320. For example, as new task data is added via the task list interface 114 of FIG. 1 and submitted or as task data is changed via the task list interface 114 and submitted, the client page is updated by the server 130 of FIG. 1 with the newly entered tasks.

Although FIG. 3 illustrates one example of a method 300 for generating a task list, various changes may be made to FIG. 3. For example, while shown as a series of steps, various steps in FIG. 3 could overlap, occur in parallel, occur in a different order, or occur any number of times.

Figure 4:
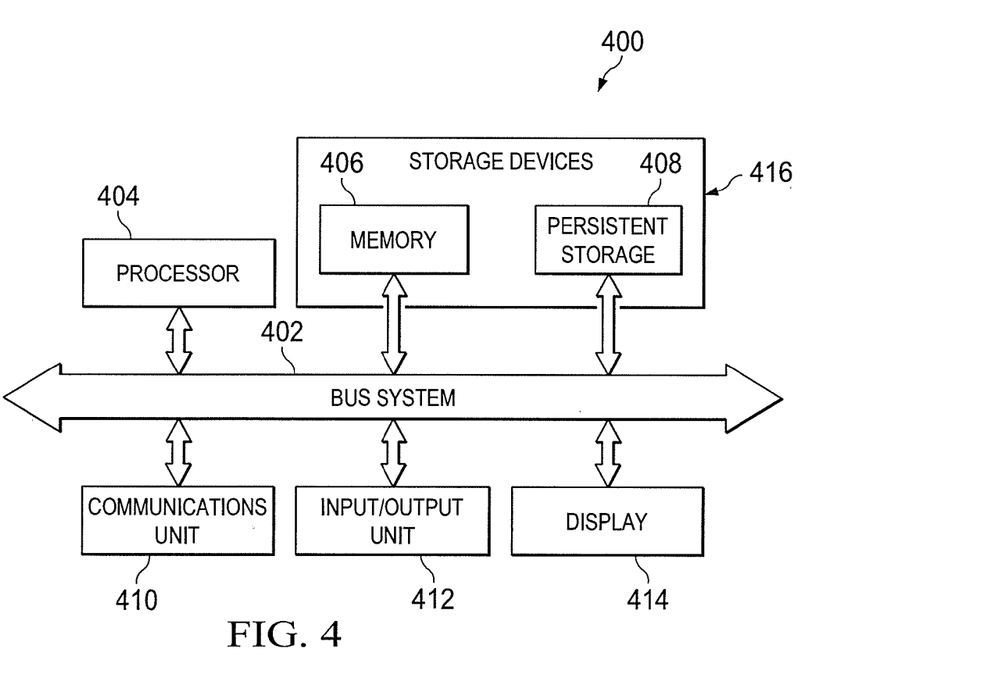
FIG. 4 illustrates an example device that can be used in the example system of FIG. 1 according to an embodiment of this disclosure.

FIG. 4 illustrates an example device 400 that can be used in the example system of FIG. 1 according to an embodiment of this disclosure. The device 400 could represent either the device 110 or the server 130 in FIG. 1.

In this example, the device 400 includes a bus system 402. The bus system 402 supports communication between a processing device 404, a memory 406, a persistent storage 408, a communications unit 410, an input/output (I/O) unit 412, and a display or display interface 414. Any suitable bus or buses could be used here.

The processing device 404 processes software instructions loaded into the memory 406. The processing device 404 may include a single processor, multiple processors, one or more multi-processor cores, or other type of processor depending on the particular implementation. As an example, the processing device 404 may be implemented using a number of heterogeneous processor systems in which a main processor is present with secondary processors on a single chip. As another example, the processing device 404 may be a symmetric multi-processor system containing multiple processors of the same type. Any suitable processing device (s) could be used.

The memory 406 and the persistent storage 408 are examples of storage devices 416. A storage device is any piece of hardware capable of storing information, such as data, program code, and/or other suitable information on a temporary or permanent basis. The memory 406 may be a random access memory Or other volatile or non-volatile storage device(s). The persistent storage 408 may contain one or more components or devices, such as a hard drive, flash memory, optical disc, or other persistent storage device (s). A storage device may be fixed or removable, such as when a removable hard drive or USB thumb drive is used.

The communications unit 410 provides for communications with other systems or devices. For example, the communications unit 410 could include a network interface card or a wireless transceiver. The communications unit 410 may provide communications through physical or wireless communications links.

The I/O unit 412 allows for input and output of data using other components connected to or integrated within the device 400. For example, the I/O unit 412 may provide a connection for user input through a keyboard, mouse, or other input device. The I/O unit 412 may also send output to a display, printer, or other output device. The I/O unit 412 could alternatively include a keyboard, mouse, or other input or output device(s). If the device 400 includes a display 414, the display 414 provides a mechanism to visually present information to a user. The display 414 could represent a touchscreen.

Program code for an operating system, applications, or other programs may be located in the storage devices 416, which are in communication with the processing device 404 through the bus system 402. Instructions forming the programs may be loaded into the memory 406 for processing by the processing device 404.

Although FIG. 4 illustrates one example of a device 400 that can be used in the system 100, various changes may be made to FIG. 4. For example, FIG. 4 is simply meant to illustrate possible components in one specific implementation. Each of the components 110, 130 in FIG. 1 could be implemented in other ways, such as other ways that incorporate one or more processing devices, one or more memory units storing data and instructions used/generated/collected by the processing device(s), and one or more interfaces for communicating over the network 120.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit" and "receive," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving a plurality of tasks by receiving one or more letters, numbers, or characters spelling each task;

displaying each task in a multi-line task entry interface in real time, wherein each task is started on a separate line in the multi-line task entry interface;

parsing each task in real time as the task is being received to identify one or more keywords in the task, wherein each task is parsed each time one of the one or more letters, numbers, or characters is received;

in response to identifying the one or more keywords, applying each keyword to a corresponding parameter of the task among a plurality of parameters to produce a modified task; and displaying each modified task in a task list interface in real time as the modified task is produced, the task list interface having a first column representing a first of the parameters and a second column representing a second of the parameters, wherein the task entry interface and the task list interface are presented together on a common display, wherein the first parameter is a first one of a category, a priority, a delegate, or a status of the task, and the second parameter is a second one of a category, a priority, a delegate, or a status of the task.

2. The method of claim 1, further comprising:

receiving a change to a first task among the plurality of tasks in the multi-line task entry interface after a second task among the plurality of tasks has been received; and updating in real time the modified task in the task list interface associated with the first task.

3. The method of claim 1, wherein each of the one or more letters, numbers, or characters associated with the plurality of tasks that are input into the task entry interface is presented in the task list interface.

4. The method of claim 1, further comprising:

generating a task list based at least in part on the modified tasks.

5. The method of claim 2, further comprising:

parsing the second task that is received subsequent to the first task and identifying the one or more keywords in the second task; and in response to identifying the third one or more keywords, associating the second task with the first task.

6. The method of claim 5, wherein associating the second task with the first task includes determining a hierarchy between the second task and the first task based on the one or more keywords in the second task.

7. The method of claim 5, wherein associating the second task with the first task includes determining that the second task is a subtask of the first task based on the one or more keywords in the second task.

8. An apparatus comprising:

at least one processing device configured to:

receive a plurality of tasks by receiving one or more letters, numbers, or characters spelling each task;

display each task in a multi-line task entry interface in real time, wherein each task is started on a separate line in the multi-line task entry interface;

parse each task in real time as the task is being received to identify one or more keywords in the task, wherein each task is parsed each time one of the one or more letters, numbers, or characters is received;

in response to identifying the one or more keywords, apply each keyword to a corresponding parameter of the task among a plurality of parameters to produce a modified task; and display each modified task in a task list interface in real time as the modified task is produced, the task list interface having a first column representing a first of the parameters and a second column representing a second of the parameters, wherein the task entry interface and the task list interface are presented together on a common display, wherein the first parameter is a first one of a category, a priority, a delegate, or a status of the task, and the second parameter is a second one of a category, a priority, a delegate, or a status of the task.

9. The apparatus of claim 8, wherein the at least one processing device is further configured to:

receive a change to a first task among the plurality of tasks in the multi-line task entry interface after a second task among the plurality of tasks has been received; and update in real time the modified task in the task list interface associated with the first task.

10. The apparatus of claim 8, wherein the at least one processing device is configured to present, in the task list interface, each of the one or more letters, numbers, or characters associated with the plurality of tasks that are input into the task entry interface.

11. The apparatus of claim 8, wherein the at least one processing device is further configured to generate a task list based at least in part on the modified tasks.

12. The apparatus of claim 9, wherein the at least one processing device is further configured to:

parse the second task that is received subsequent to the first task and identify the one or more keywords in the second task; and in response to identifying the one or more keywords, associate the second task with the first task.

13. The apparatus of claim 12, wherein the at least one processing device is further configured to determine a hierarchy between the second task and the first task based on the one or more keywords in the second task.

14. The apparatus of claim 12, wherein the at least one processing device is further configured to determine that the second task is a subtask of the first task based on the one or more keywords in the second task.

15. A non-transitory computer readable storage medium comprising instructions that, when executed by at least one processing device, cause the at least one processing device to:

receive a plurality of tasks by receiving one or more letters, numbers, or characters spelling each task;

display each task in a multi-line task entry interface in real time, wherein each task is started on a separate line in the multi-line task entry interface;

parse each task in real time as the task is being received to identify one or more keywords in the task, wherein each task is parsed each time one of the one or more letters, numbers, or characters is received;

in response to identifying the one or more keywords, apply each keyword to a corresponding parameter of the task among a plurality of parameters to produce a modified task; and display each modified task in a task list interface in real time as the modified task is produced, the task list interface having a first column representing a first of the parameters and a second column representing a second of the parameters, wherein the task entry interface and the task list interface are presented together on a common display, wherein the first parameter is a first one of a category, a priority, a delegate, or a status of the task, and the second parameter is a second one of a category, a priority, a delegate, or a status of the task.

16. The computer readable storage medium of claim 15, further comprising instructions that, when executed by the at least one processing device, cause the at least one processing device to:

receive a change to a first task among the plurality of tasks in the multi-line task entry interface after a second task among the plurality of tasks has been received; and update in real time the modified task in the task list interface associated with the first task.

17. The computer readable storage medium of claim 15, further comprising instructions that, when executed by the at least one processing device, cause the at least one processing device to:

present, in the task list interface, each of the one or more letters, numbers, or characters associated with the plurality of tasks that are input into the task entry interface.

18. The computer readable storage medium of claim 15, further comprising instructions that, when executed by the at least one processing device, cause the at least one processing device to:

generate a task list based at least in part on the modified tasks.

19. The computer readable storage medium of claim 16, further comprising instructions that, when executed by the at least one processing device, cause the at least one processing device to:

parse the second task that is received subsequent to the first task and identify the one or more keywords in the second task; and in response to identifying the one or more keywords, associate the second task with the first task.

20. The computer readable storage medium of claim 19, further comprising instructions that, when executed by the at least one processing device, cause the at least one processing device to:

determine that the second task is a subtask of the first task based on the one or more keywords in the second task.

\* \* \* \* \*